US008354353B2

(12) United States Patent
Abds-Sami et al.

(10) Patent No.: US 8,354,353 B2
(45) Date of Patent: Jan. 15, 2013

(54) CUBIC BORON NITRIDE CERAMIC COMPOSITES AND METHODS OF MAKING THEREOF

(75) Inventors: Malik Abds-Sami, Westerville, OH (US); Stephen Dole, Columbus, OH (US)

(73) Assignee: Diamond Innovations, Inc., Worthington, OH (US)

( * ) Notice: Subject to any disclaimer, the term of this patent is extended or adjusted under 35 U.S.C. 154(b) by 31 days.

(21) Appl. No.: 12/561,600

(22) Filed: Sep. 17, 2009

(65) Prior Publication Data

US 2010/0069224 A1 Mar. 18, 2010

Related U.S. Application Data

(60) Provisional application No. 61/097,777, filed on Sep. 17, 2008.

(51) Int. Cl.
*C04B 35/5831* (2006.01)
*C04B 35/117* (2006.01)

(52) U.S. Cl. ............... 501/96.5; 501/95.3; 501/97.2; 501/97.4; 501/98.2; 501/98.6; 501/127

(58) Field of Classification Search ........... 501/96.4, 501/98.1, 98.2, 98.3, 97.2, 97.4, 127, 98.6
See application file for complete search history.

(56) References Cited

U.S. PATENT DOCUMENTS

| 4,540,674 | A | * | 9/1985 | Watanabe et al. | 501/96.4 |
|---|---|---|---|---|---|
| 4,863,881 | A | | 9/1989 | Ahrens et al. | |
| 5,389,587 | A | * | 2/1995 | Nakashima et al. | 501/96.4 |
| 5,605,871 | A | * | 2/1997 | Baldus et al. | 501/96.4 |
| 5,627,542 | A | * | 5/1997 | Paquette | 264/122 |
| 5,914,286 | A | | 6/1999 | Collin et al. | |
| 5,925,584 | A | * | 7/1999 | Dodds et al. | 501/98.1 |
| 6,043,176 | A | | 3/2000 | Brandt | |
| 6,562,746 | B2 | * | 5/2003 | Enya et al. | 501/96.4 |
| 2003/0162648 | A1 | | 8/2003 | Middlemiss | |
| 2008/0075543 | A1 | | 3/2008 | Zhu et al. | |

FOREIGN PATENT DOCUMENTS

| EP | 439419 | * | 7/1991 |
|---|---|---|---|
| EP | 0 701 982 | | 3/1996 |
| EP | 1043292 A1 | | 11/2000 |
| EP | 1 338 582 | | 8/2003 |
| JP | 5301776 | | 11/1993 |
| JP | 06263544 | * | 9/1994 |
| JP | 7082031 | | 3/1995 |
| JP | 7133154 | | 5/1995 |
| JP | 7252581 | | 10/1995 |
| JP | 08002969 | * | 1/1996 |
| JP | 9157771 | | 6/1997 |
| WO | 91 08992 | | 6/1991 |

OTHER PUBLICATIONS

Machine translation of JP 08-002969, Jan. 1996.*
Boron nitride-Wikipedia, pp. 1-14, no date.*
Translation of Japanese document 06263544, Sep. 1994.*

(Continued)

*Primary Examiner* — Karl Group
(74) *Attorney, Agent, or Firm* — Frank Gao; Maria Gasaway

(57) ABSTRACT

Composite materials composed of cubic boron nitride (cBN) and a matrix component of various ceramic oxides, nitrides, and solid solutions of matrix materials as well as whisker reinforcements. Methods of manufacture and their use in high performance machining of ferrous metals are also claimed and disclosed.

12 Claims, 4 Drawing Sheets

OTHER PUBLICATIONS

Lo Casto S, et al., "Wear performance of ceramic cutting tool materials when cutting steel", 7th International Conference on Computer-aided production engineering, Cookeville, TN, USA, Aug. 13-14, 1991, Elsevier, NL, Jan. 1, 1991, pp. 25-36.

Sornakumar T., "Advanced ceramic-ceramic composite tool materials for metal cutting applications", Key Engineering Materials, Trans Tech Publications, Ltd., Stafa-Zurich, CH, vol. 114, Jan. 1, 1996, pp. 172-187.

Fukuhara, M., K Fukazawa, and A. Fukawa, Physical properties and cutting performance of silicon nitride ceramic. Wear, 1985. 102: p. 195-210, USA.

Ekström, T. and M. Nygren, SiAlON ceramics. J. Am. Ceram. Soc., 1992. 75(2): p. 259-276, USA.

Govila, R.K, Fracture of hot-pressed alumina and SiC-whisker-reinforced alumina composite. Journal of Materials Science, 1988. 23: p. 3782-3791. USA.

Baek, Y.K. and C.H. Kim, The effect of whisker length on the mechanical properties of alumina-SiC whisker composites. Journal of Materials Science, 1989. 24: p. 1589-1593. USA.

Xia, K. and T.G. Langdon, Fracture behavior at elevated temperatures of alumina matrix composites reinforced with silicon carbide whiskers. Journal of Materials Science, 1996. 31: p. 5487-5492. USA.

Unni, C.K. and D.E. Gordon, Mechanical properties of monolithic AlN and SiCw/AlN composites. Journal of Materials Science, 1995. 30: p. 1173-1179. USA.

Xu, L., et al., Synthesis, evaluation and characterization of alumina ceramics with elongated grains. Ceramics International, 2005. 31: p. 953-958. USA.

Park, D.-S., et al., Improved High-Temperature Strength of Silicon Nitride Toughened with Aligned Whisker Seeds. J Am Ceram Soc, 2005. 88(2): p. 383-389. USA.

Yang, J.-F., et al., Improvement of Mechanical Properties and Corrosion Resistance of Porous b-SiAlON Ceramics by Low $Y_2O_3$ Additions. J Am Ceram Soc, 2004. 87(9): p. 1714-1719. USA.

Xiao-Zheng Rong, et al., "TEM investigation of high-pressure reaction sintered cBN-Al composites", Journal of Materials Science, vol. 39, 2004, pp. 4705-4710, Kluwer Academic Publishers.

Sneary, P.R., Z. Yeh, and M.J. Crimp, Effect of whisker aspect ratio on the density and fracture toughness of SiC whisker-reinforced $Si_3N_4$. Journal of Materials Science, 2001. 36(10): p. 2529-2534. USA.

Fukasawa, T. And Y. Goto, Mechanical properties of $Si_3N_4$ ceramics reinforced with SiC whiskers and SiC platelets. Journal of Materials Science, 1998. 33: p. 1647-1651. USA.

* cited by examiner

CUBIC BORON NITRIDE CERAMIC COMPOSITES AND METHODS OF MAKING THEREOF

CROSS-REFERENCE TO RELATED APPLICATIONS

This application is related to and claims the benefit of U.S. Provisional Patent Application Ser. No. 61/097,777, filed Sep. 17, 2008.

BACKGROUND

1. Technical Field

Composite materials composed of cubic boron nitride (cBN) and a matrix component of various ceramic oxides, nitrides, and/or solid solutions of matrix materials thereof as well as carbide whiskers and methods of manufacturing thereof.

2. Description of the Related Art

Compositions of cutting tools having a majority of cubic boron nitride (cBN) phase (e.g. greater than 50 volume %) with various ceramic additions (such as oxides, nitrides, and carbides) have been commercialized for machining of cast iron, hardened steels, and other metals. However, the machining of certain cast iron alloys, such as ductile iron or composite graphite iron, presents difficulties due to the high temperatures generated from frictional heat during machining. It is believed that the high temperatures generated at the cutting point in some of these cast iron machining applications can lead to a chemical reaction between the iron and cBN, which is referred to as "chemical wear". This in turn often leads to premature failure of the cutting tool.

Various compositions for cutting tools have been introduced in an attempt to address this problem. For example, alumina based cutting tools can potentially overcome the problem of chemical wear since alumina exhibits high chemical stability. However, alumina is prone to brittle fracture. Cutting tools composed of silicon nitride based ceramics, including solid solutions of silicon nitride, alumina, and aluminum nitride, such as the silicon aluminum oxynitrides phases have also been used for machining ferrous metals and alloys.[1-4] While their stability at high temperatures is beneficial, they do not possess the hardness and abrasion resistance exhibited by cBN containing cutting tools.

Additionally, fiber or whisker reinforcement is a strategy that has been pursued to impart greater fracture toughness to ceramic materials. As it relates to cutting tools designed for machining steel and iron, increased fracture toughness is a desirable attribute. For instance, it has been shown, in the case of alumina ($Al_2O_3$), that incorporation of whiskers of silicon carbide (SiC) [6-8] can significantly increase fracture toughness and lead to better performance in certain applications. SiC whiskers have been incorporated in a $Si_3N_4$,[9, 10] or AlN matrix.[11] SiC whiskers have also been added to $Al_2O_3$, mullite, or $B_4C$ (U.S. Pat. No. 4,543,345). Other whisker reinforcement methods[12, 13] and other whisker materials such as carbides, borides, and nitrides of titanium, zirconium, and other transition metals, have been reported.

Ceramic cutting tools reinforced by SiC whiskers, as well as other whisker materials, such as nitrides, borides, and carbides of transition metals (such as those of group 4 and 5) have been described. The incorporation of whisker reinforcements into a cBN ceramic by sintering has not been described. In particular, whiskers have not been incorporated into a ceramic matrix that also includes cBN. Nor has such a ceramic matrix including cBN and the dispersion of SiC whiskers homogeneously within the matrix or the maintenance of the integrity of the whiskers under the high pressures required for sintering cBN been described.

The disclosure contained herein describes attempts to address one or more of the problems described above. Accordingly, there is a need to provide a material that provides desired hardness, improved abrasion resistance, high temperature stability and resistance to chemical wear as well as for making a cutting tool that allows for faster cutting speeds.

SUMMARY

In an embodiment, a composite material may be composed of cubic boron nitride (cBN) and a matrix component of various ceramic oxides, nitrides, and solid solutions of matrix materials. A ceramic matrix composite may include cubic boron nitride, aluminum oxide, silicon nitride. The ceramic matrix composite may further include aluminum nitride and/or solid solutions of silicon nitride, aluminum oxide and aluminum nitride. The composite may further include an additive element such as at least one of, lanthanoids, yttrium or scandium. In an embodiment, the additive element is added in the form of an oxide.

A method of making a ceramic matrix composite may include providing a powder, blending cubic boron nitride, aluminum oxide and silicon nitride in the powder to form a mixture and sintering the mixture at a temperature of at least about 1200° C. and a pressure of at least about 40 kBar to form a sintered product. The method may further include the step of fabricating the sintered product into a cutting tool. The powder may also include aluminum nitride and/or an additive element in the form of an oxide. The additive element may be lanthanoids, yttrium or scandium. The method may further include the step of adding silicon carbide whiskers and/or silicon nitride whiskers to the powder.

Another embodiment includes a ceramic matrix composite having cubic boron nitride (cBN) and silicon carbide whiskers. The composite may further include silicon nitride whiskers and an additive element. The additive element may be at least one of lanthanoids, yttrium or scandium or their oxides. The silicon carbide whiskers may be about 1 to about 2 μm by about 17 to about 20 μm in dimension, in an alternate embodiment about 1.5 μm by about 18 μm in dimension.

DETAILED DESCRIPTION

Figure 1:
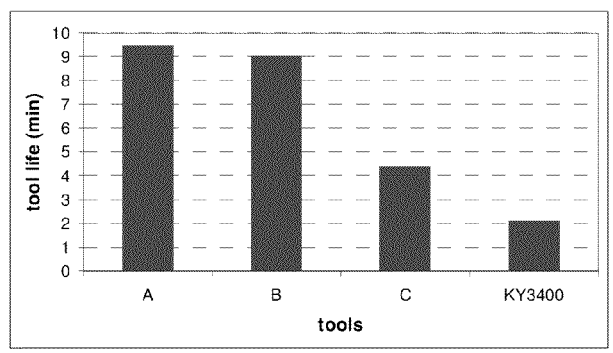
FIG. 1 illustrates tool life between three compositions made in accordance with an embodiment.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising"

as used herein is intended to mean "including but not limited to." Unless defined otherwise, all technical and scientific terms used herein have the same meanings as commonly understood by one of ordinary skill in the art.

The disclosure generally relates to a ceramic composite that exhibits improved chemical wear resistance and thermal stability in tooling applications. In particular, the disclosure relates to a ceramic composite having cubic boron nitride (cBN), aluminum oxide, and silicon nitride. Another embodiment includes a ceramic composite having cBN, aluminum oxide, aluminum nitride and silicon nitride. In yet another embodiment, a ceramic composite may include cBN and solid solutions of silicon nitride, aluminum oxide, and aluminum nitride.

The as sintered ceramic composite includes about 10 to about 30 percent by weight (wt. %) cBN, in an embodiment, about 10 to about 20 wt. % cBN. The size of the cBN particles may be about 0.5 to about 10 µm, in an embodiment, less than about 5 µm. The composite may also include about 40 to about 80 wt. % aluminum oxide, about 10 to about 50 wt. % silicon nitride, and about 0 to about 50 wt. % aluminum nitride, with a sum total content of these ceramics about 70 to about 90 wt. %. Alternate embodiments may include up to about 15 wt. % silicon carbide whiskers or up to about 15 wt. % ceramic whiskers.

The addition of silicon nitride to the ceramic composite provides advantages and surprising resulting properties. When a composition is prepared that contains only cubic boron nitride and aluminum oxide, the material formed by HPHT sintering exhibits poor bonding between the cBN and alumina phases. This is clearly discernable from the surface of the material after polishing with diamond media. The surface appears rough with many pitted areas that result from cBN particles being pulled out during the polishing process. Microscopic examination confirms that many of the cBN particles are absent from the polished surface leaving small pits in the surface. This is indicative of weak bonding between the cBN and aluminum oxide and would be expected to produce an inferior cutting tool material. When the composition contains at least about 5 vol. % of silicon nitride, the bonding between cBN and alumina is greatly improved as evidenced by the smooth, non-pitted finish obtained after polishing the sintered material. Microscopic examination of this polished surface shows that the cBN grains remain bonded in the aluminum oxide matrix.

In embodiments, the ceramic matrix composite may further include an additive element. The additive element may be at least one of lanthanoids, yttrium or scandium. The additive elements may be in an oxide form. In an embodiment, the composite may include 0 to about 20 wt. % yttrium oxide ($Y_2O_3$), in an embodiment, less than about 5 wt %. Yttrium oxide is generally used as a sintering aid for silicon nitride in which instance the yttrium oxide forms a silicate and provides a liquid phase at the high temperatures at approximately about 1900° C. used to sinter silicon nitride.[14] However, the addition of yttrium oxide to the ceramic composition containing aluminum oxide, silicon nitride, and cBN results in a well-sintered material even though the sintering temperature may be lower than about 1900° C. In an embodiment, the amount of the additive element to the composition is less than about 5 wt. % of the total ceramic content or about 10 wt. % of the silicon nitride content. Additionally the additive element also provides a liquid phase that is beneficial.

In an embodiment herein, a ceramic composite may be made as described as follows. cBN may be blended into a powder mixture containing silicon nitride, aluminum nitride, aluminum oxide, and yttrium oxide. The blend may then be loaded into a suitable container and sintered at a temperature of about 1200° C. or higher and a pressure of about 40 kBars or greater. The resulting sintered material may then be further fabricated into cutting tools suitable for high speed machining of cast irons and steels.

Another embodiment generally relates to a ceramic composite matrix having cBN particles and silicon carbide whiskers. The silicon carbide whiskers provide the desired fracture toughening properties. The ceramic matrix composite may further include silicon nitride whiskers and or alternatively include hafnium or zirconium nitride and/or carbide whiskers. The ceramic composite matrix may have about 1 to about 20 percent by volume (vol. %) silicon carbide whiskers, in an embodiment, about 5 to about 15 vol. %. The silicon carbide whiskers may be about 1 to about 2 µm in diameter by about 17 to about 20 µm in length, in an embodiment, about 1.5 µm by about 18 µm, and are dispersed homogenously. One skilled in the art will understand that the homogeneity of a material is determined after sintering by observing a polished sample, for example, under optical or electron microscope. Particles per unit area can be calculated by any method utilized in the art, including for example manually or by image analysis. The aspect ratio of the grains in the cBN matrix is about 2:1-20:1, in an embodiment, about 2:1-12:1, in another embodiment, about 2:1-10:1. In alternate embodiments, silicon nitride or silicon carbide whiskers may be substituted with titanium nitride or titanium carbide whiskers.

An additive element such as lanthanoids, yttrium and scandium, for example an oxide of yttrium or ytterbium, may be added to the ceramic composite to aid in the sintering process as discussed above. For example, in an embodiment, yttrium oxide may be added to the cBN-aluminum oxide-silicon nitride composition containing silicon carbide whiskers to sinter the silicon nitride. In addition to aiding in the sintering process of the composition, the additive element may also provide a liquid phase at high temperatures. Another embodiment may include silicon nitride whiskers. In an embodiment, embodiment, about 5 wt. % of the additive element may be included.

Yet another embodiment includes a method of making a ceramic matrix composite. The method includes providing a cBN-aluminum oxide-silicon nitride powder mixture and adding silicon carbide whiskers to form a mixture. The additive element such as yttrium oxide may also be added to the mixture. Aluminum nitride may also be added to the mixture. Any milling process as understood by one skilled in the art may be utilized in the process so long as the process is capable of preserving the whiskers in the cBN matrix. The mixture may be then sintered at greater than about 40 kbar pressure, for example, about 40-80 kbar pressure and at a temperature range greater than about 1200° C., for example about 1200-2000° C. Alternatively, silicon nitride whiskers may be added or blended into the mixture.

For example, SiC whiskers may be dispersed in isopropanol by milling in a planetary ball mill with tungsten carbide milling media to form a slurry. Subsequently, $Si_3N_4$, cBN, and aluminum oxide powder may be added to this mixture and further milled Aluminum nitride may also be added to the mixture. The resulting slurry may be dried at room temperature to form a powder, which may then be pressed into pills (about 1 inch diameter×0.25 inch thick) under approximately 50 kbar pressure and 1200° C. For example, the ceramic powder may be loaded into a grafoil lined salt tube with graphite pills on either side and hot pressed at approximately 50 kbar, and 1200° C. for about 30 min.

An additional example includes dispersing aluminum oxide, silicon nitride, aluminum nitride, yttrium oxide, and cBN powders in isopropanol by milling in a planetary ball mill or a rotary ball mill, with WC milling media, to form a thin slurry. The slurry is dried, in air, at room temperature; then the resulting powder is sieved from the milling media. This ceramic powder blend is then loaded into a high pressure cell and pressed at approximately 50 kBar, and 1200° C. for about 30 min. Alternatively, compositions are prepared as combinations of alumina (65-70 volume %), cBN (25 volume %) and silicon nitride (5-10 volume %) by ball milling the powders for about 4 hours with tungsten carbide milling media in isopropanol. The milled mixture is dried, loaded onto a carbide substrate and pressed at approximately 50 kbar and 1200° C. for 30 minutes.

EXAMPLE 1

Inventive 5.7 grams of $Si_3N_4$, 21.0 grams of $Al_2O_3$, 8.4 grams of AlN, 9.0 grams of cBN, and 0.75 grams of $Y_2O_3$ were milled together with 30 grams of isopropanol and 400 grams of WC milling media (¼ inch diameter spheres) in a 500 mL capacity milling bowl in a planetary ball mill (Retsch PM400) for 20 min at 200 rpm, reversing direction of rotation every 5 min. The slurry was dried in air, at room temperature for about 2 hours before it was sieved to separate the powder from the milling media (50 mesh sieve). The powder was heated to 1000° C. for 1 hour under flowing nitrogen before it was loaded into a high-pressure cell. The powder was then loaded onto a carbide substrate, and pressed at approximately 50 kBar, and 1200° C. for 30 min.

Tools were fabricated and tested in continuous cutting in compacted graphite iron (CGI) at 400 m/min. The CGI workmaterial was procured from Sintercast to be 95% pearlite, 10% nodularity, 200-220 BHN, in the shape of cylinders 145 mm OD, 98 mm ID, 204 mm length (catalog #7080011-L). The cutting conditions were 1200 sfm, 0.010 ipr, 0.040" d.o.c. The edge-prep details are 25°×0.010" T-land, upsharp (no hone). The tests were performed on an Okuma Spaceturn LB300 lathe with a 20 hp-max main-spindle, with Jet coolant directed on top of rake face with water-soluble coolant Trim E206—30:1 concentration. Flank wear was measured periodically by microscope with endpoint at 0.008" or tool failure by chipping or fracture. Calculations from these measurements were made to obtain tool life in minutes. Tool life of 5 min and up to 0.008" of flank wear was measured.

EXAMPLE 2

Inventive 8 grams of $Si_3N_4$, 68 grams of $Al_2O_3$, 23 grams of cBN, and 1 gram of $Y_2O_3$ were ball milled for 4 hours in isopropyl alcohol with WC milling media. The slurry was dried at about 100° C. and sieved through a 40 mesh screen to remove the milling media and granulate the powder. The powder was loaded onto carbide substrates and pressed as above. Tools were fabricated and tested as described above. Tool life of about 10 min and up to 0.008" of flank wear was measured.

EXAMPLE 3

Comparative

Commercially available tools were also tested as above in the machining of compacted graphite iron. These tool materials are commonly recommended for machining compacted graphite iron by their respective manufacturers. A tool composed of beta phase $Si_3N_4$ exhibited a tool life of about 2.5 minutes. A cBN based tool with about 60% cBN-40% TiC had a tool life of about 2 minutes.

EXAMPLE 4

Inventive/Comparative

Additional cutting tools were prepared with the compositions shown in TABLE 1.

TABLE 1

| Inventive Samples | $Si_3N_4$ (wt %) | $Al_2O_3$ (wt %) | AlN (wt %) | $Y_2O_3$ (wt %) | cBN (wt %) |
|---|---|---|---|---|---|
| A | 8.1% | 68.0% | 0.0% | 0.9% | 23.0% |
| B | 4.0% | 72.5% | 0.0% | 0.5% | 23.0% |
| C | 12.7% | 46.8% | 18.7% | 1.7% | 20.1% |

Performance data was obtained in terms of minutes of tool life for three compositions in accordance with embodiments that it is composed of beta phase silicon nitride ($Si_3N_4$) and coated with titanium nitride (TiN.) Results of the test are depicted in FIG. 1. In particular, the graph illustrates performance data in minutes of tool life of compositions A, B, and C in accordance with an embodiment and the commercially available tool material (identified as KY3400, the comparative sample) using the same test. As illustrated in FIG. 1, the commercially available tool material had a tool life of two minutes while the compositions as claimed herein had a tool life of greater than two minutes. Specifically, composition A had a tool life of over 9 minutes, composition B had a tool life of 9 minutes, and composition C had a tool life of over 4 minutes. Accordingly, the inventive compositions demonstrate increased tool life performance.

EXAMPLE 5

Figure 2:
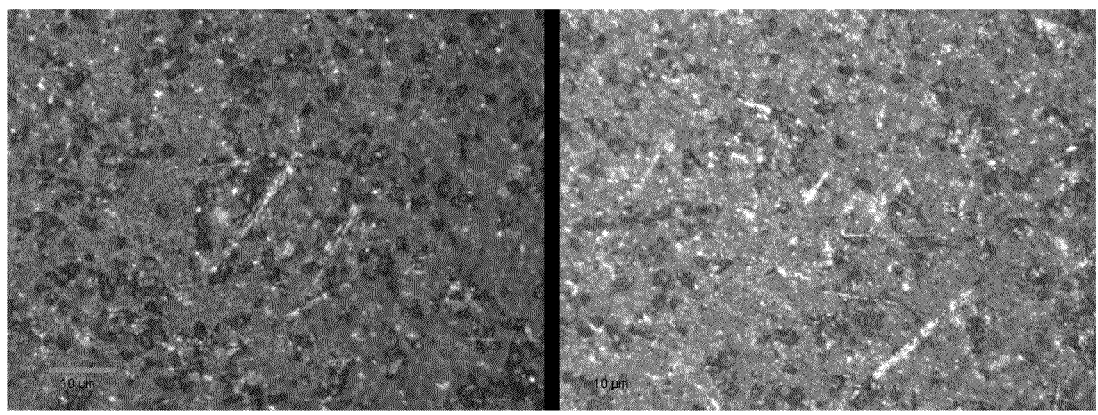
FIG. 2 shows images of a ceramic having silicon carbide whiskers in accordance with an embodiment.

Inventive 9.0 grams of SiC whiskers was milled with 50 mL propanol and 400 grams WC milling media (¼ inch diameter spheres) in a 500 mL capacity milling bowl in a planetary ball mill for about 1 min at about 100 rpm. Then, 4.3 grams of $Si_2O_3$, 4.3 grams of $Si_3N_4$, 10 grams of cBN (2.6 micron mesh), and 2.4 grams of Al (powder) were added to the milling bowl and milled for about 20 min at 100 rpm, reversing direction every 5 min. The slurry was dried in air, at room temperature for about 12 hours before it was sieved to separate the powder from the milling media (20 mesh sieve). The ceramic powder was loaded in a grafoil lined salt tube (1 inch ID, 1.5 inch OD) in between 2 graphite pills and pressed at about 50 kBar, 1200° C. for 30 min. The sample was then polished and observed under optical microscope confirming the presence of SiC whiskers in the matrix, as shown in FIG. 2. The scale bar is for 10 μm. The image on the right was taken with polarizing optics while the image on the left was taken without enhancements. The whiskers can be easily observed. A tool made from this inventive material was tested in the manner outlined in Example 1 and compared to the performance of a commercially available tool (KY3500) that is the same tool material as KY3400 except without the titanium nitride coating. The tool life of the inventive tool was more than 5 times that of the KY3500 tool.

EXAMPLE 6

Inventive

The compositions listed in Table 2 were milled and sintered according to the procedure described in Example 1. The resulting sintered materials were characterized for hardness using a Vickers indenter (Wilson-Wolpert Tukon 2100B instrument from Instron), using a 5 kg load. Results were analyzed using the Design Expert software package to obtain relationships of hardness to composition.

TABLE 2

| Samples | AlN (wt %) | $Al_2O_3$ (wt %) | $Si_3N_4$ (wt %) | cBN (2-3 μm) (wt %) | cBN (8-15 μm) (wt %) |
|---|---|---|---|---|---|
| 1 | 0.75 | 4.50 | 17.25 | 7.5 | — |
| 2 | 0.75 | 4.50 | 17.25 | — | 7.5 |
| 3 | 1.50 | 4.50 | 16.50 | 7.5 | — |
| 4 | 1.50 | 4.50 | 16.50 | — | 7.5 |
| 5 | 0.75 | 9.00 | 12.75 | 7.5 | — |
| 6 | 0.75 | 9.00 | 12.75 | — | 7.5 |
| 7 | 1.50 | 9.00 | 12.00 | 7.5 | — |
| 8 | 1.50 | 9.00 | 12.00 | — | 7.5 |

Figure 3:
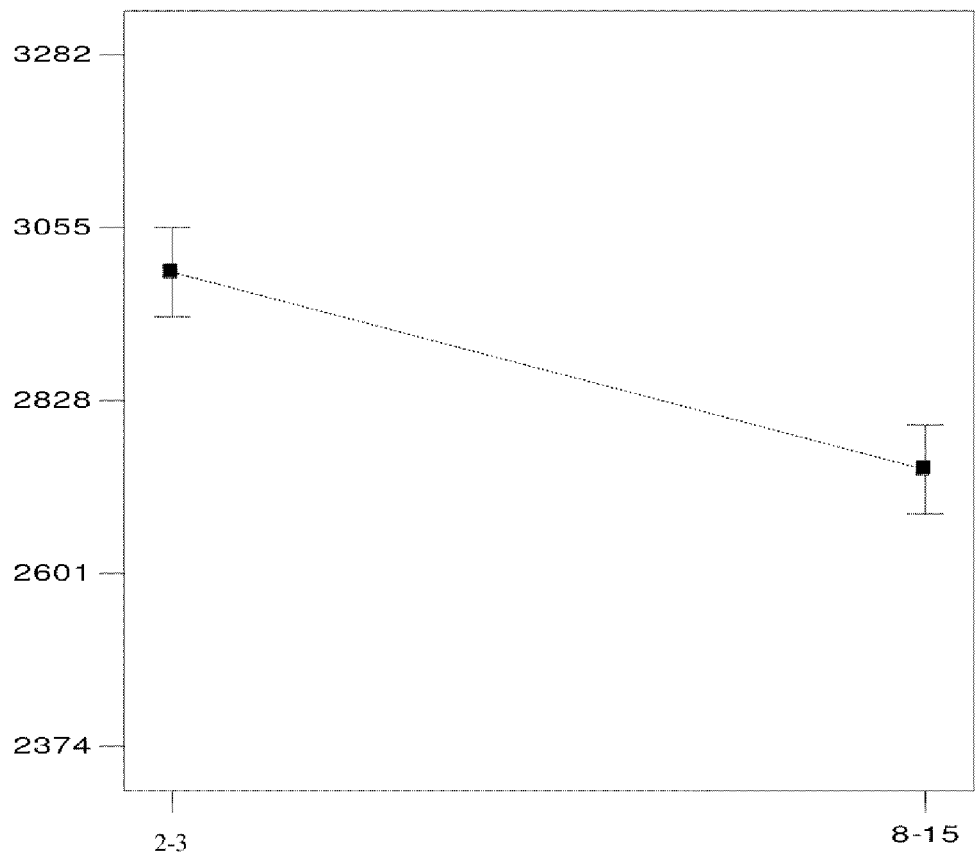
FIG. 3
Figure 4:
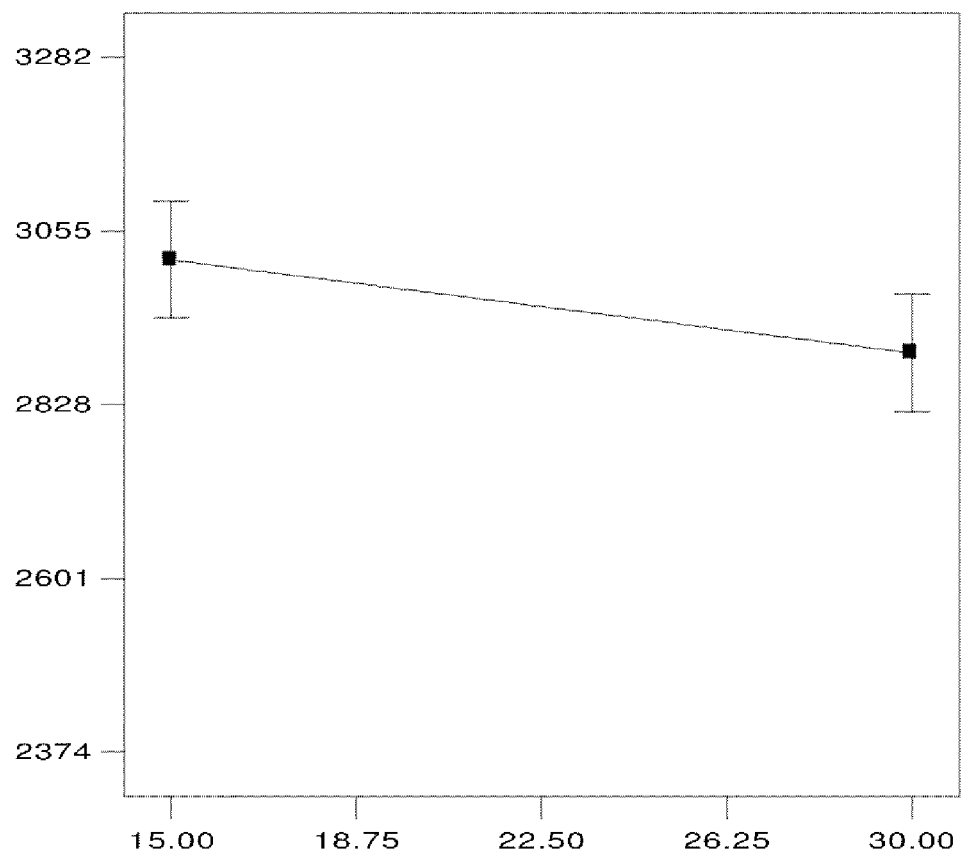
FIG. 4
Figure 5:
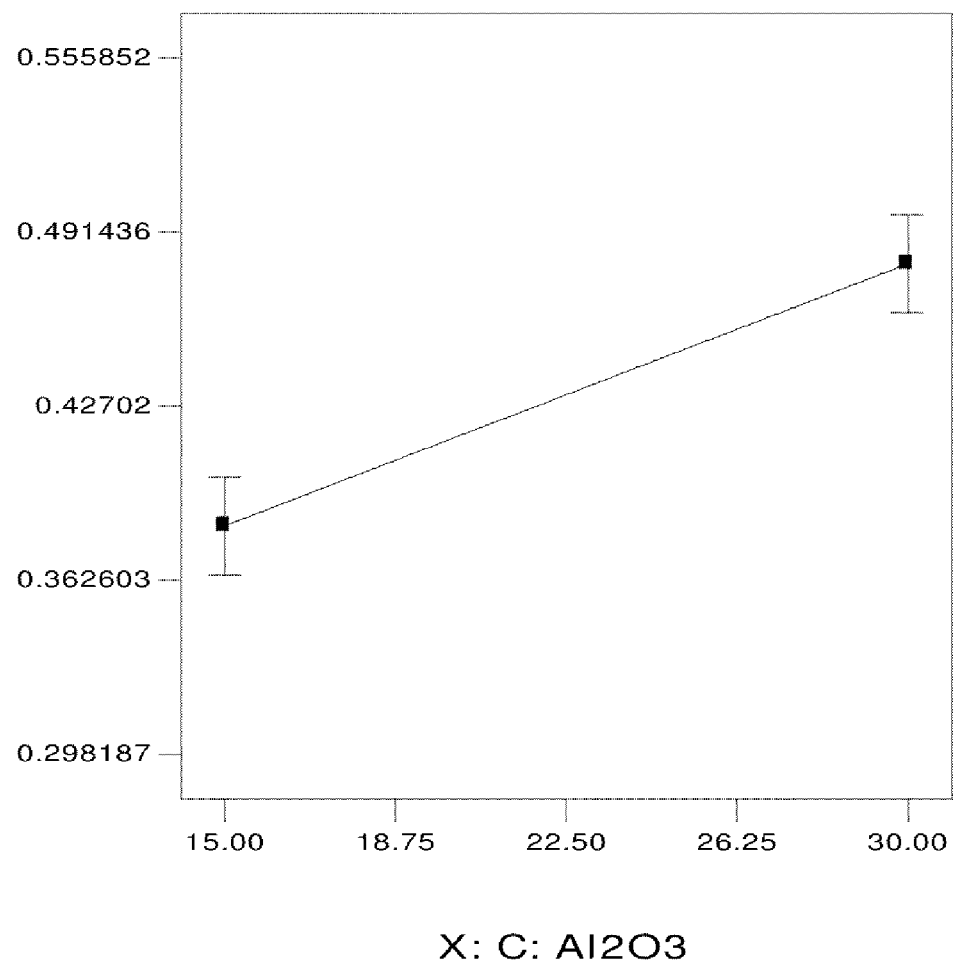
FIG. 5

FIG. 3 shows that as the amount 2-3 μm cBN increases, the hardness increases. FIG. 4 shows that hardness diminishes with increasing alumina content. Whereas FIG. 5 shows that percentage of beta phase silicon nitride (as determined by XRD analysis) increases with alumina content.

Accordingly, the described embodiments provide numerous advantages. In particular, the ceramic matrix composites provide improved chemical wear resistance and thermal stability, including increased tool life as well as decreased flank wear. Additionally, the ceramic matrix composites allow for faster cutting speeds and improved abrasion resistance compared to conventional composites. These and other advantages will be appreciated by one skilled in the art.

Equivalents

Although the invention has been described in connection with certain exemplary embodiments, it will be evident to those of ordinary skill in the art that many alternatives, modifications, and variations may be made to the disclosed invention in a manner consistent with the detailed description provided above. Also, it will be apparent to those of ordinary skill in the art that certain aspects of the various disclosed example embodiments could be used in combination with aspects of any of the other disclosed embodiments or their alternatives to produce additional, but not herein explicitly described, embodiments incorporating the claimed invention but more closely adapted for an intended use or performance requirements. Accordingly, it is intended that all such alternatives, modifications and variations that fall within the spirit of the invention are encompassed within the scope of the appended claims.

The invention claimed is:

1. An as-sintered ceramic matrix composite comprising: between about 10 wt % to about 20 wt % cBN; between about 40 wt % to about 80 wt % aluminum oxide; and between about 10 wt % to about 50 wt % silicon nitride.

2. The ceramic matrix composite according to claim 1, further comprising aluminum nitride.

3. The ceramic matrix composite according to claim 1, further comprising solid solutions of silicon nitride and aluminum oxide.

4. The ceramic matrix composite according to claim 1, further comprising a solid solution of silicon aluminum oxynitride.

5. The ceramic matrix composite according to claim 2, further comprising a solid solution of silicon aluminum oxynitride.

6. The ceramic matrix composite according to claim 2, further comprising solid solutions of silicon nitride, aluminum oxide and aluminum nitride.

7. The ceramic matrix composite according to claim 1, further comprising oxides of lanthanoids, yttrium or scandium.

8. The ceramic matrix composite according to claim 1, where said composite further comprises up to about 15 wt % ceramic whiskers.

9. The ceramic matrix composite according to claim 8, further comprising about 5 wt % or less of an additive selected from oxides of lanthanoids, yttrium or scandium.

10. An as-sintered ceramic matrix composite comprising:
between about 10 wt % to about 20 wt % cubic boron nitride (cBN);
between about 40 wt % to about 80 wt % aluminum oxide;
between about 10 wt % to about 50 wt % silicon nitride; and
about 5 wt % or less of an additive selected from oxides of lanthanoids, yttrium or scandium.

11. An as-sintered ceramic matrix composite comprising between about 10 wt % to about 20 wt % cubic boron nitride (cBN); between about 40 wt % to about 80 wt % aluminum oxide; between about 10 wt % to about 50 wt % silicon nitride; between about 5 wt % or less of an additive selected from oxides of lanthanoids, yttrium or scandium made from a method comprising the steps of:
providing a powder, wherein the powder comprises cBN, silicon nitride and aluminum oxide;
blending powder to form a mixture; and
sintering the mixture at a temperature of about at least 1200° C. and pressure of at least 40 kbar to form a sintered product.

12. A tool made from a method comprising the steps of:
providing a powder, wherein the powder comprises cBN, silicon nitride and aluminum oxide;
blending powder to form a mixture; and
sintering the mixture at a temperature of about at least 1200° C. and pressure of at least 40 kbar to form a sintered product; wherein the tool comprises:
between about 10 wt % to about 20 wt % cubic boron nitride (cBN); between about 40 wt % to about 80 wt % aluminum oxide; between about 10 wt % to about 50 wt % silicon nitride; between about 5 wt % or less of an additive selected from oxides of lanthanoids, yttrium or scandium.

* * * * *

UNITED STATES PATENT AND TRADEMARK OFFICE
CERTIFICATE OF CORRECTION

PATENT NO. : 8,354,353 B2  Page 1 of 1
APPLICATION NO. : 12/561600
DATED : January 15, 2013
INVENTOR(S) : Abds-Sami Malik et al.

It is certified that error appears in the above-identified patent and that said Letters Patent is hereby corrected as shown below:

Title Page, Item (75)

First inventor name should read Abds-Sami Malik.

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,354,353 B2
APPLICATION NO. : 12/561600
DATED : January 15, 2013
INVENTOR(S) : Abds-Sami Malik et al.

It is certified that error appears in the above-identified patent and that said Letters Patent is hereby corrected as shown below:

Title Page, Item (12) "Abds-Sami et al."

should read -- Malik et al. --

Title Page, Item (75)

First inventor name should read -- Abds-Sami Malik --.

This certificate supersedes the Certificate of Correction issued June 4, 2013.

Signed and Sealed this
Second Day of July, 2013

Teresa Stanek Rea
*Acting Director of the United States Patent and Trademark Office*